MILTON U. CLAUSER
INVENTOR.

BY Albert Rosen
ATTORNEY

Oct. 26, 1965      M. U. CLAUSER      3,213,693
RADIO FREQUENCY INERTIAL ORIENTATION SYSTEM
Filed Aug. 19, 1959      6 Sheets-Sheet 4

MILTON U. CLAUSER
INVENTOR.

BY Albert Rosen

ATTORNEY

MILTON U. CLAUSER
INVENTOR.

BY Albert Rosen
ATTORNEY

United States Patent Office 3,213,693
Patented Oct. 26, 1965

3,213,693
RADIO FREQUENCY INERTIAL ORIENTATION SYSTEM
Milton U. Clauser, Rolling Hills, Calif., assignor, by mesne assignments, to TRW Inc., a corporation of Ohio
Filed Aug. 19, 1959, Ser. No. 834,861
10 Claims. (Cl. 73—505)

This invention relates to improvements in control arrangements useful in inertial reference systems, and more particularly to an improved inertial reference control system using the phenomena of electrical superconductivity for supplying yaw, pitch, and roll reference.

Some present well-known systems capable of providing inertial guidance utilize either spinning masses or vibrating masses capable of operation in substantially fixed relative planes for the purpose of providing references for guidance purposes. However, due to spinning mass bearing friction or internal resistance of resilient members supporting the vibrating masses, a substantial amount of precession occurs causing errors in the guidance system reference. Many steps have been taken to reduce errors due to bearing friction, but they have not proven completely satisfactory. For example, drive means have been provided for driving the outer races of the spinning mass support bearings in opposite directions. Although this provides some improved operational conditions, it is obvious that some bearing friction still exists and, therefore, causes the introduction of error into the guidance system. Other friction reducing arrangements are known, but all suffer from the accuracy limitations inherent in a purely mechanical reference system.

It is, therefore, an object of this invention to provide an improved inertial reference control arrangement useful in providing inertial reference guidance, wherein the arrangement is characterized by a relatively high accuracy and reliability.

The foregoing and related objects are realized in an inertial reference control arrangement predicted upon sustaining the flow of radio-frequency electromagnetic energy within a cavity or container through the use of the phenomena of superconductivity. The direction of orientation of the energy is made independent of the orientation of its container so that motion of the container relative to the orientation direction can be used to generate control signals for inertial guidance purposes.

In one embodiment of the invention two superconductive enclosures are used. Each of the enclosures forms a cavity capable of receiving radio-frequency energy which is propagated within the cavity to form a node position within it. Each cavity is provided with a detector for detecting the node position and for providing an output signal in response to a deviation of the detector means away from the node position. Each of the enclosures forming the cavities are freely gimbaled, with the enclosures mounted in fixed relationship with each other so as to provide directional information relative to three mutually perpendicular directions. One of the enclosures is used to propagate two mutually perpendicular radio-frequency waves within it, so as to provide information relative to two of the three mutually perpendicular directions. The other enclosure provides information relative to the third of the three mutually perpendicular directions and may also be used to provide error detecting information for assuring the receipt of accurate position indicating information. Each cavity is provided with a drive mechanism for repositioning it in response to deviations detected by its detector means. The amount of required repositioning is a measure of the amount of direction change of the vehicle.

In the six sheets of drawings, wherein like reference characters refer to like parts.

The phenomena of superconductivity

Pertinent aspects of the phenomena of superconductivity will be discussed before the arrangements of the invention are explained in detail. In the investigation of the electrical properties of materials at very low temperatures it has been found that the electrical resistance of many materials drops abruptly as the temperature is lowered to that close to absolute zero (0° Kelvin)—the material in such a state being termed superconductive. That the electrical resistance of a material in a superconductive state is actually zero, or so close to it as to be undetectable by measurement, has been well illustrated by experiments at the Massachusetts Institute of Technology where a relatively large current, induced in a lead ring immersed in liquid helium, continued to flow without any detectable decay for a period of over two years.

The temperature at which the change occurs, from a normally resistive state to the superconductive state, is called the transition temperature. For example, the following materials have transition temperatures, and become superconductive, as noted:

| | Degrees Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |
| Titanium | 0.5 |

Only a few of the materials exhibiting the phenomena of superconductivity are listed above. Other elements, and many alloys and compounds, become superconductive at temperatures ranging between 0° of the order of 20° Kelvin. A discussion of many such materials may be found in a book entitled "Superconductivity," by D. Schoenberg, Cambridge University Press, Cambridge, England, 1952. The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature.

In addition, the above-listed transition temperatures apply only for values of electrical current flow which do not exceed a critical value. When a current in excess of a critical value flows through a material, the transition temperature of the material is decreased. In such a case the material is in an electrically resistive state even though the temperature of the material is lower than the normal transition temperature. The action of a current in lowering the temperature at which a transition occurs (from a state of normal electrical resistivity to one of superconductivity) is similar to the lowering of the transition temperature by a magnetic field. The reason for this appears to be that the current flowing in the material generates a magnetic field having a strength which, if externally applied, would lead to the same result in lowering the transition temperature.

Accordingly, when a material is held at a temperature below its normal transition temperature for a zero magnetic field, and is thus in a superconductive state, the superconductive condition of the material may be extinguished by the application of a magnetic field which may originate in an external source or may be generated internally of the material through the flow of current through it.

Figures 1, 2:
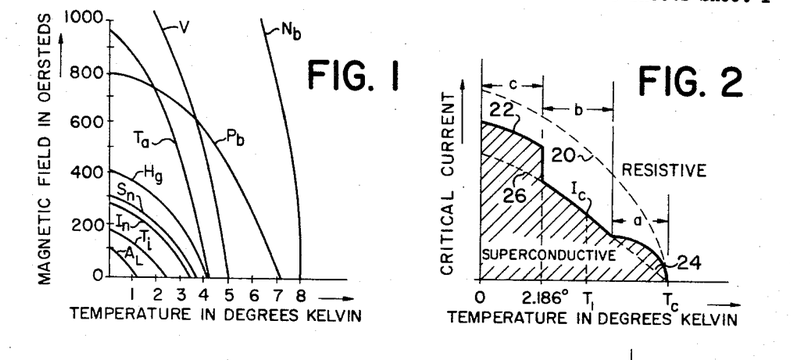
FIGURE 1 is a graph illustrating the general variation in superconductive transition temperature for various materials subjected to a magnetic field.
FIGURE 2 is a graph of the transition temperature of a thin indium film as a function of applied direct current.

FIGURE 1 illustrates the variation in transition temperatures for several materials as a function of an applied magnetic field. In the absence of a magnetic field, the point at which each of the several curves intersects the abscissa is the transition temperature at which the material becomes superconductive. The transition temperature is given in degrees Kelvin. The particular material is in a superconductive state for values of temperature and magnetic field falling beneath each of the several curves, while for values of temperature and magnetic field falling above a curve, the material possesses electrical resistance.

Since a current flowing in a superconductive material has an effect upon the transition temperature that is similar to the effect of a magnetic field, the passage of a current through such materials will yield transition curves similar to those illustrated in FIGURE 1. It has been found that if the material is in the bulk form a cylindrical wire, the transition curve relating critical direct electric current and transition temperature is relatively smooth; the dashed line curve 20 of FIGURE 2 illustrates such a relationship for indium. However, if a superconductive material takes the form of a relatively thin film, the shape of the curve relating critical direct current and transition temperature is somewhat different. The thin film relationship curve is illustrated in FIGURE 2 by a solid line 22. This line 22 illustrates the effect of varying a steady direct electric current through a thin film made of indium and immersed in liquid helium. At any given temperature, $T_1$ for example, the element becomes resistive as the current is increased above a critical direct current value, $I_c$.

In FIGURE 2, three different temperature regions are observed in connection with the phenomena depicted by line 22. In the first region, $a$, complete transition of the indium film from the super-conductive to the resistive state is preceded by localized transitions within the film. These localized transitions, which are thought to be due to mechanical imperfections in the film, occur at current levels somewhat lower than the levels associated with the solid line 22 critical current. These somewhat lower transition current levels are illustrated by dashed line portion 24. In the second temperature region, $b$, any localized transition is almost instantaneously followed by a complete transition of the entire film at the same current level. In the third region, $c$, the region below 2.186° Kelvin (the lambda point of helium), localized transitions occur at current densities slightly lower than the current densities required for complete transition of the entire film. The lower current level required for the initiation of localized transition in this third region, $c$ is indicated in the drawing by dashed line portion 26.

*Inertial guidance control arrangements*

The superconductive phenomena referred to proves useful, in accordance with the invention, in enabling the propagation of a sustained radio-frequency wave within a cavity defined by a container or enclosure having superconductive inner walls. If the sustained radio-frequency wave is established with a particular orientation, and the container defines a cavity that is summetrical with respect to substantially all orientations of the wave within the cavity, the direction of orientation of the wave is independent of the orientation of its container. Consequently, motion of the container relative to the wave orientation direction can be used to generate control signals for inertial guidance purposes.

For the purposes of explanation the superconductive cavities will be described as taking a spherical form. When spherical cavities are used the radio-frequency waves propagated within the cavities should preferably have a wave length equal to substantially the diameter of the cavity. For example, in operation in what is known as the $TM_{101}$ mode in a spherical cavity, the wave length should actually be 2.29 $r$, where $r$ is the radius of the sphere. Thus, for example, a spherical cavity having a radius of about 13 centimeters should be operated with an injected wave at a frequency of about $10^9$ cycles per-second. The radio-frequency waves to be propagated within the cavities may be injected into the cavities, or detected from without the cavities, through the use of one of the number of different kinds of radio-frequency probes.

Figure 3:
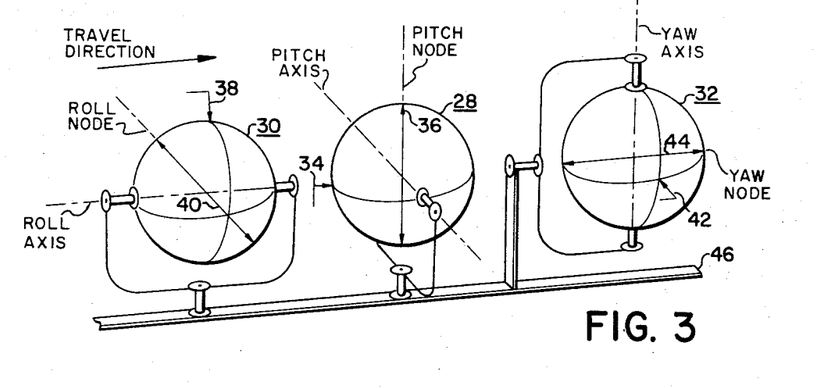
FIGURE 3 is a schematic representation of three superconductive spherical cavities, each cavity supporting within it plane-oriented radio-frequency waves in directions perpendicular to the directions of orientation of the waves in the other cavities.

Consider now the schematic representation of FIGURE 3 where containers defining three spherical cavities 28, 30, and 32 are depicted. It can be seen that if a radio-frequency wave is injected into the first spherical cavity 28 in a $TM_{101}$ mode at an injection point 34, and if the spherical cavity 28 is electrically perfect, a magnetic field node will exist along a double arrowed line 36. At this same injection point 34 a current node will exist at the surface of the cavity 28 at one of the points along the line 36. It is at one of the node points (along the line 36) that a radio-frequency wave detector (not shown) is introduced to the interior of the cavity 28; since the detector is at the node position, little or no wave energy losses will occur. If, in addition to the first spherical cavity 28, we also provide a second spherical cavity 30 with a radio-frequency energy injection point 38 at a location 90 degrees from the corresponding injection point of the first cavity, a magnetic field node will exist in the second cavity along the double arrowed line 40. Since the point of injection into this second cavity 30 is displaced with respect to the point of injection of the first cavity 28, this second cavity 30 is capable of operation in a different plane. In order to provide complete directional control, a third spherical cavity 32 is provided for detection in a third reference plane. For this purpose the third cavity 32 is provided with an injection point 42 at a location 90 degrees apart from the corresponding injection points of the first and second cavities 28 and 30. A magnetic field node for the third cavity 32 lies along a double arrowed line 44, and thus node detection locations for the magnetic field of the wave in the third cavity is indicated by intersections of this line 44 with a cavity surface. Three mutually perpendicular reference planes are provided (giving roll, pitch, and yaw detection) through the use of the three spherical cavities.

In FIGURE 3 the three spherical cavities 28, 30, and 32 are illustrated as being defined by containers gimbaled for support on a single reference support or table 46 in order to show clearly the interrelated cooperation of the cavities. Gimbals are provided for each of the containers in order to prevent excessive energy losses from them due to deviations of a vehicle from its desired course, as will be explained hereinafter.

It should be pointed out at this time that although three superconductive cavities have been shown in FIGURE 3, and will be discussed in explaining the operation of the invention, a complete three plane detecting system is desirably accomplished through the use of two cavities, as will be described hereinafter in connection with FIGURES 14 and 15.

Figures 4, 4A, 5, 6:
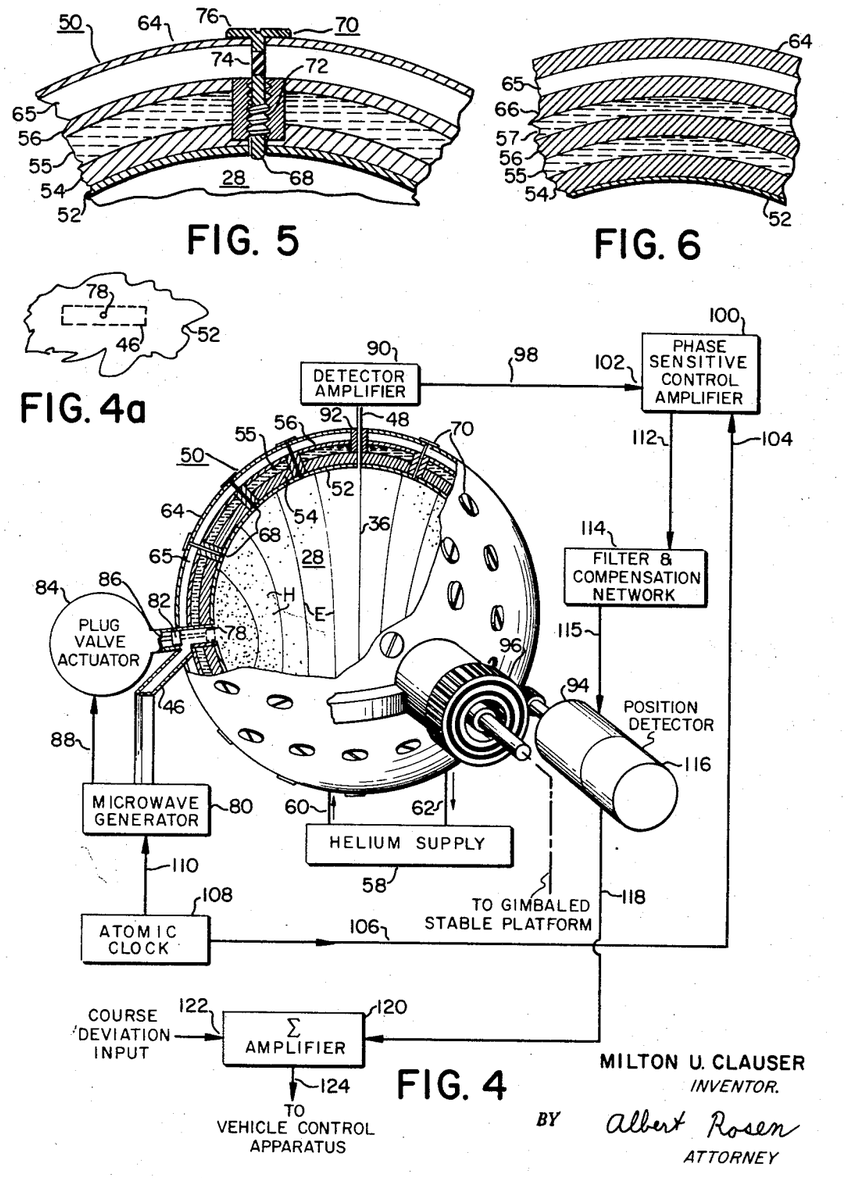
FIGURE 4 is a partially schematic, partially cutaway pictorial representation of a superconductive container defining a spherical cavity, and associated apparatus, of the type useful in supporting the propagation of plane-polarized waves.
FIGURE 4a is a fragmentary view of a portion of the wave injection arrangement of FIGURE 4.
FIGURE 5 is an enlarged fragmentary view of a portion of the arrangement depicted in FIGURE 4.
FIGURE 6 is an enlarged fragmentary view of a portion of an arrangement similar to that depicted in FIGURE 4, but illustrating another aspect of the invention.

A more detailed structural arrangement (FIGURES 4 and 5) will now be discussed in order to explain more clearly what is required to provide a radio-frequency waveform for a single detection plane. In FIGURE 4 the means for injecting energy into, and detecting energy from, the cavity 28 are shown to be in the form of wave guides 46 and 48. (FIGURE 4a, to be discussed in greater detail, illustrates the energy injection arrangement.)

The container assembly 50 defining the spherical cavity 28 of FIGURES 4 and 5 includes a cavity defining portion 52 made of a material, such as lead, that is capable of being maintained in a superconductive state. Since most materials that exhibit the phenomena of superconductivity usually exhibit relatively low structural strengths, it is desirable to provide the cavity defining material with a supporting container 54 of some stronger material, say of copper. This supporting container 54 is provided with an interior coating portion 52 of superconductive material of sufficient thickness or depth to allow the coating portion 52 to remain in a superconductive state throughout normal operation of the apparatus. If the coating portion 52 is made of lead, and if this portion is to be maintained in a superconductive state through the use of a liquid helium refrigerant, it has been found that its thickness should be at least of the order of 5000 angstrom units. The radio-frequency energy within the container assembly 50, during normal operation of the apparatus, may tend to return parts of the coating 52 to a resistive state if the coating portion 52 is made as thin as of the order of about 1000 angstrom units. Intermediate bonding materials (not shown) may be used between the coating portion 52 and its supporting container 54 in order to assure structural integrity of the cavity defining arrangement.

Since, as indicated in FIGURES 1 and 2, the superconductive cavity defining portion 52 is in a superconductive state only during the experience of temperatures approaching absolute zero, it is necessary to supply to this portion a cooling medium such as liquid helium. In order to contain the liquid helium about the superconductive portions of the container assembly 50, an enclosing outer container 56 is provided, the outer container 56 being spaced apart from the inner, support container 54 and mounted concentrically with it. The region between the inner, support container 54 and the adjacent outer container 56 is filled with liquid helium from a helium supply 58 to form a blanket 55 surrounding the cavity. The liquid helium is piped into a hollow cavity formed between the inner and outer containers 54 and 56 through suitable insulated pipes 60 and 62. Since the containers 54 and 56 are cooled to a point near absolute zero, it is necessary to insulate them to prevent excessive thermal losses. Protection against excessive thermal losses is provided by the use of a third or outermost container 64 that is positioned about the inner and outer containers 54 and 56, and is spaced apart from them. The region 65 of space between the outer container 56 and the outermost container 64 is preferably evacuated to form a vacuum insulated region for preserving the cavity cooling system form excessive thermal losses.

FIGURE 6 illustrates a modification useful in connection with the cooling arrangement described above in connection with FIGURES 4 and 5. In order to even further preserve the superconductive cavity cooling arrangement from excessive thermal losses, the liquid helium blanket 55 surrounding the superconductive cavity may itself be surrounded by a cooling blanket. For example, the outer container 56 for the helium blanket may itself be surrounded by a blanket 57 of liquid nitrogen, the liquid nitrogen being maintained in position surrounding the helium blanket 55 by virtue of being contained between the outer container 56 and a still another container 66. In such a case the still another container 66 is spaced apart from the outermost container 64, and the region 65 between the two is maintained evacuated.

Referring back to FIGURES 4 and 5, since a perfect spherical cavity can not readily be formed, it is necessary to provide suitable shims 68 for adjusting the dimensions, and thus the electrical qualities, of the superconductive cavity 28 so as to assure that it is substantially electrically perfect to an injected radio-frequency waveform. The shims 68 should be positioned appreciably less than a wave length apart in order to effectively present an electrically perfect spherical cavity to the injected wave. The shims 68 are made available to the exterior of the container assembly 50 through suitable shim assemblies 70. As shown in FIGURE 5, a shim assembly 70 may take the form of a bolt having an end portion defining the shim 68, a threaded shank portion 72, a thermal insulating shank portion 74 (to minimize thermal conductivity losses between the walls 56 and 64 defining the evacuated cavity 65), and a slotted head portion 76.

Several different modes of wave propagation may be realized within a superconductive cavity. The one illustrated in the drawings is commonly referred to as the lowest mode or order of wave propagation within a spherical cavity, the $TM_{101}$ mode, and is selected here for purposes of explanation of the operation of the invention. In this mode the maximum of the electric field will exist along an axis of the cavity, with the electric field falling to zero at the surface of the cavity. At the same time, the magnetic field will be at zero along that axis and at a maximum in a region adjacent to the surface of the spherical cavity. This mode of operation may be excited in several different ways such as by means of magnetic coils, by means of a dipole fed by a coaxial cable, or by means of a slot fed by a wave guide. Whatever the method used for exciting the cavity, the feed mechanism should be made to effectively disappear after excitation of the desired waveform is realized in order to reduce the losses that would be encountered by the exciting arrangement remaining within the cavity.

Wave guides are used for coupling energy into and out of the cavity of FIGURE 4. It is realized that if a wave guide is used for energy injection or detection, the width of the waveguide (for example, the width of wave guide 46 in FIGURE 4a) must be of the same order of magnitude as the radius of the cavity. However, the waveguide-to-cavity coupling iris or opening 78 can be appreciably smaller. Of course, some wave energy attenuation is realized if the opening has an appreciably smaller dimension than that of the wave guide width. This attenuation is of course desirable in order to minimize wave energy extraction losses from the cavity.

In order to position the node of an injected waveform along the node line 36 (FIGURE 3), of the superconductive cavity 28, the point 34 of wave injection should be displaced from the node line 36 by 90 degrees and should be at a point that is relatively high in magnetic field energy. The method of injection shown in FIGURES 4 and 4a involves the use of an iris or opening 78 provided with the suitable wave guide 46 connected to a microwave generator 80. In order to maintain the superconducting qualities of the cavity after injection of energy into it, a suitable sealing valve or plug 82 is provided, the plug having a cavity sealing portion made of a superconductive material. The plug 82 is movable from its open position, illustrated in FIGURE 4, to a position (shown in phantom) forming a substantially smooth, continuous superconductive cavity surface. The plug 82 is moved by an actuator 84 connected to the plug through a suitable link 86. The actuator 84 is controlled in operation, as by means of a connection 88 to the microwave generator 80, to seal the cavity by the plug 82 except when introduction of microwave energy into the cavity 28 is desired.

Therefore, it can be seen that with the plug 82 in its retracted position, radio-frequency energy can be emitted from the microwave generator 80 through the wave guide 46 and into the cavity 28, and immediately thereafter, the energy entrance into the cavity can be sealed by rapid movement of the plug 82 into its sealing position. With the plug in position, the energy is prevented from being expended back through the wave guide opening 78, thus keeping losses to a minimum.

At this point we have the radio-frequency wave established within the superconductive cavity 28, with the wave node along the line 36. In order to provide a means of sensing movement of the superconductive cavity enclosure about the injected radio-frequency wave, a detector-amplifier 90 is provided. This amplifier 90 has a wave guide 48 that enters the cavity at a location adjacent to the node line 36. The wave guide 48, too, is provided with suitable insulation 92 for reducing thermal conduction losses to a minimum.

As long as the cavity 28 is maintained in the exact position that it occupied during waveform injection, the detector wave guide 48 will be positioned along the node line 36. If, however, the cavity enclosure is rotated, causing the detector wave guide 48 to be displaced from the node position, energy will be passed through the wave guide 48 to the detector-amplifier 90. A node position deviation of extremely small amounts will result in energy detection by the detector-amplifier 90. The amplitude of the detected energy gives an indication of the magnitude of the direction change, and thus is also a measure of the magnitude of cavity reorientation required to return the cavity to its original position relative to the wave contained in it; the phase of the detected energy (that is, the polarity of the detected energy) gives an indication as to whether clockwise or counterclockwise rotational motion is needed to return the cavity to its original relative position. Thus the amplitude of the detected wave gives magnitude-of-needed-correction information, while the phase of the detected wave gives direction-of-needed-correction information.

Figure 7:
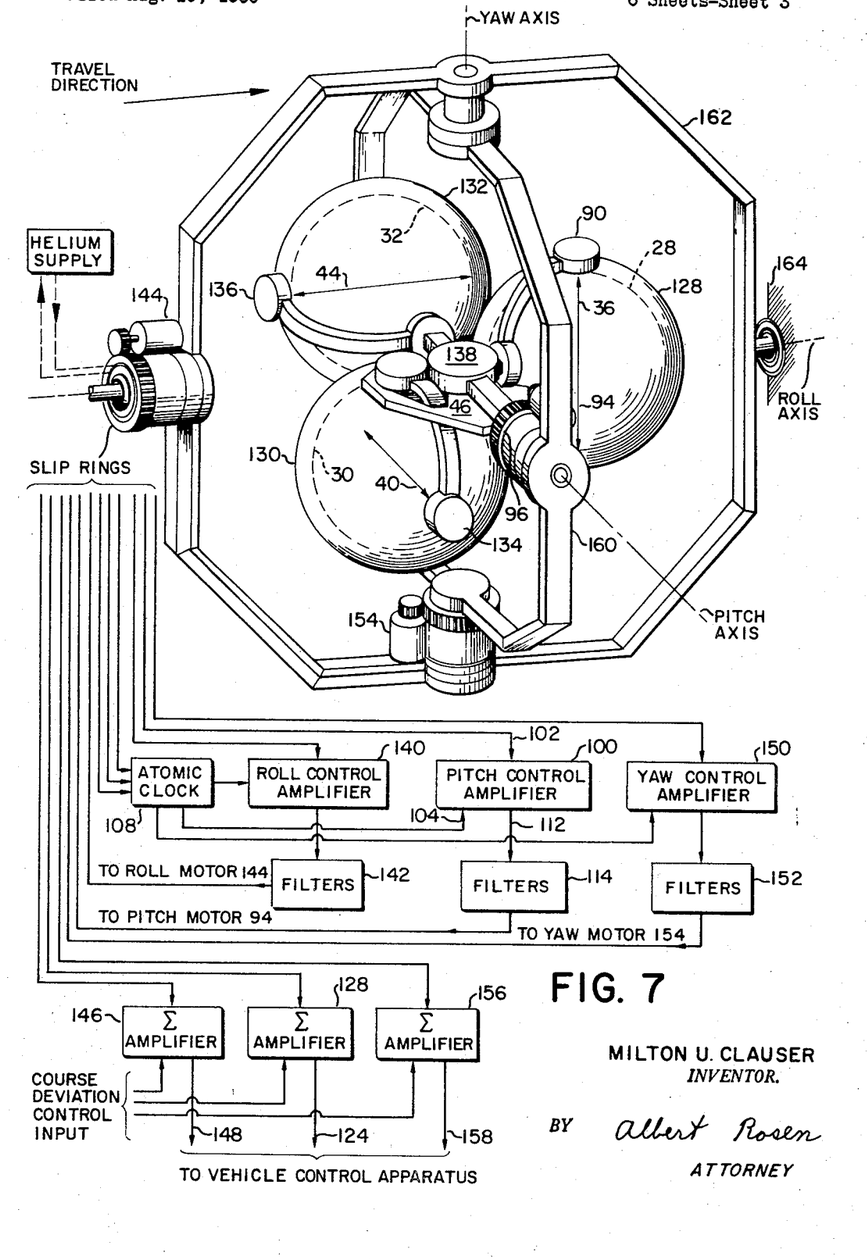
FIGURE 7 is a diagrammatic view of three spherical superconductive cavity enclosures mounted on a gimbaled platform, and associated inertial guidance control system circuitry.

In order to keep injected wave losses to a minimum, a suitable drive means or motor 94 is provided for returning the cavity enclosure to the node position described as soon as deviation occurs. The motor 94 is connected to the container assembly 50 and, through suitable mechanical linkage such as by gearing 96, to an enclosure supporting platform which is gimbaled for free directional movement. Such a platform 46 is illustrated in FIGURE 7. Under some conditions the container assembly 50 may be separately gimbaled (not shown). The motor 94 is driven in response to deviation detection by the detector-amplifier 90 which provides an output signal through an output path 98 to a first input 102 of a phase sensitive control amplifier 100. The control amplifier 100 is provided with a second or control input 104 by a connection 106 to a suitable reference means, such as an atomic clock 108. One typical atomic clock is described in principle in an article by Harold Lyons on page 71 of the February 1957 issue of the Scientific American magazine.

The purpose of the atomic clock 108 is to provide an exact reference for detecting phase relationship of the signal from the detector-amplifier 90 for determining the direction of rotation of the motor 94. In order to provide a phase or error reference, the atomic clock is used as a reference for the microwave generator 80 through a timing control path 110. The output signal from the detector-amplifier 90 is compared with the output signal from the atomic clock 108 resulting in an output over a path 112 to suitable filters 114. Thus an output control signal is provided over a path 115 to the motor 94. Rotational movement of the motor 94, realized through receipt of the control signal from the filters 114, is monitored by a suitable position deviation detector 116. This detector 116, in turn, provides an output signal over a path 118 to a summation amplifier 120 capable of providing a direction indicating output signal (over an output signal path 124) to a utilization circuit such as vehicle control apparatus (not shown).

The summation amplifier 120 is provided with an additional signal input path 122 for the purpose of directing a vehicle from its original course. To provide this control a course changing input signal is introduced over the path 122 to the summation amplifier 120, which results in the initiation of a vehicle re-directing control signal over the path 124 to the vehicle control apparatus (not shown). As the vehicle begins to deviate from its original course the detector-amplifier 90 detects the deviation and causes the control amplifier 100 to drive the motor 94 to reposition the cavity container assembly 50 and the detector-amplifier 90 back to their original position. Movement of the motor 94 results in the initiation of a signal from the deviation detector 116 to the summation amplifier 120. This signal, over the path 118 to the summing amplifier 120, eventually balances the course deviation input signal (from the path 122) when the directed deviation of the vehicle from the original path has been satisfied. The radio-frequency energy within the cavity 28 is not dissipated during or after repositioning to the new course since the detector-amplifier 90 has been repositioned to the node of the injected waveform during the repositioning.

It is pointed out at this time that the detector-amplifier 90 can be displaced in a number of different planes containing the node line 36. A displacement in directions in any of these planes will result in a signal being detected by the detector-amplifier 90. If, however, the system used is one involving a desired detection in one plane only, the detection circuitry is arranged so that the phase of the detected signal (as compared to the atomic clock signal) can be passed only when the deviation is in the desired plane. In order to preserve the cavity 28 from radio-frequency energy losses due to detector-amplifier movement in directions along planes other than the desired one, the system utilizes a gimbaled platform 46 (FIGURE 7) with separate detection cavities 28, 30, and 32 for each of the other mutually perpendicular planes. With this arrangement deviation from the node position in any plane will be rapidly corrected, with detection resulting only in the desired cavity for each plane.

Referring now to FIGURE 7, there is shown a complete guidance system utilizing three superconductive cavities 28, 30, and 32 defined by respective cavity enclosures 128, 130, and 132 gimbaled for three axes rotation. In addition to the previously described pitch axis cavity 28 and its associated detector-amplifier 90, there is also provided a respective roll axis cavity 30 and associated detector-amplifier 134, and a respective yaw axis cavity 32 and associated detector-amplifier 136. The microwave generator and plug valve control mechanisms described in connection with FIGURE 4 are here located within a suitable container 138 interconnecting the three cavities.

The control system shown in the system of FIGURE 7 is a complete system for three direction sensing cavities similar to the single cavity system described in connection with FIGURE 4. The system of FIGURE 7 provides control by each of the cavities for the axes shown. For example, the pitch control cavity 28 is provided with the pitch control amplifier 100, the filter compensation network 114, the pitch control motor 94, the pitch summation amplifier 120 and the vehicle control output 124. Similarly, the roll axis control cavity 30 is provided with the detector-amplifier 134, a roll control amplifier 140, suitable filters 142, a roll control motor 144, a roll summation amplifier 146, and a roll control output path 148. The yaw axis control is provided by the yaw control sphere 32, its detector-amplifier 136, a yaw control amplifier 150, suitable filters 152, a yaw control motor 154, a yaw summation amplifier 156, and a yaw output vehicle control path 158. Each detector cavity and its associated control system acts to maintain the platform 46 stabilized both along its respective axis and with respect to the cavity injected energy by providing output signals to the axes drive motors, these motors providing outputs to the vehicle control apparatus (not shown) by means of the respective output paths 124, 148, and 158. The atomic clock 108 provides reference signals for each of the control amplifiers 100, 140, and 150 and for the microwave generator or generators within the container 138.

The platform 46 is supported for pivotal movement upon a suitable gimbal 160 which is in turn pivotally supported upon a second support gimbal 162 which is also pivotally supported on a suitable vehicle support 164.

Figure 8:
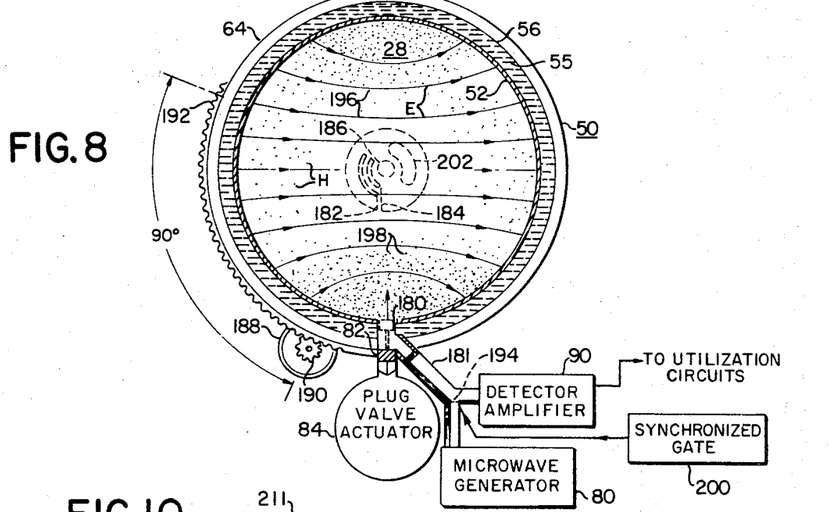
FIGURE 8 is a view of an embodiment of the invention as applied to a spherical superconductive cavity enclosure having a common plane-oriented wave injection and detection opening.

In order to simplify the construction and operation of the superconductive cavities, for minimizing energy losses, it may be desirable to provide microwave injection and detection through a common means at a single location relative to a cavity. The structure of FIGURE 8 illustrates one system arrangement capable of accomplishing this result. This arrangement uses a single opening 180 in a wave guide 181 for realizing radio-frequency energy injection and detection.

If we assume again that the cavity shown in this figure is the pitch control cavity 28, it can be seen that the cavity 28 is again provided with the surrounding containers 56 and 64 for the purpose of providing helium cooling and evacuated zones as described in connection with FIGURE 4. The helium supply, shown in phantom (lines 182 and 184) is connected to the liquid helium cavity 55 through a pivoted platform support provided by a pivot 186. The pivot 186 is required in order to move the wave guide opening 180 from injection position to detection position for the two different modes of operation. This repositioning is provided by a suitable control drive means or motor 188 having a pinion gear 190 meshing with a suitable curvilinear rack 192 mounted along a circumferential portion of the container assembly 50.

Since the wave guide 181 serves as a detection wave guide as well as an injection wave guide, it is necessary to have a wave guide switch 194 for providing the two different functions. Assume that the wave guide switch 194 is in the position shown in FIGURE 8, with the plug 82 withdrawn by the plug valve actuator 84. At this time microwave energy is being injected into the cavity 28 to form the energy pattern represented by the electrical field lines 196 and the magnetic field dots 198. When the radio-frequency energy level within the cavity 28 is of sufficient strength, the plug 82 is moved into its closed position (shown in phantom) by the plug valve actuator 84, the function switch 194 is moved to its opposite (phantom line) positon by a suitable synchronized gate or actuator 200, and the rack and pinion motor 188 is energized to drive the container apparatus 50 counterclockwise by 90 degrees. When in the position 90 degrees from that shown in FIGURE 8, the plug valve actuator 84 is again actuated to retract the plug 82 to open the wave guide 181 to the receipt of radio-frequency energy from the cavity 28, the energy being conducted by the wave guide 181 to the detector-amplifier 90. If the container apparatus 50 is displaced in a direction moving the wave guide 181 away from node position, by virtue of deviation of the controlled vehicle from its intended course, a portion of the radio-frequency energy from the cavity 28 is fed by the wave guide 181 to the detector-amplifier 90.

Figure 9:
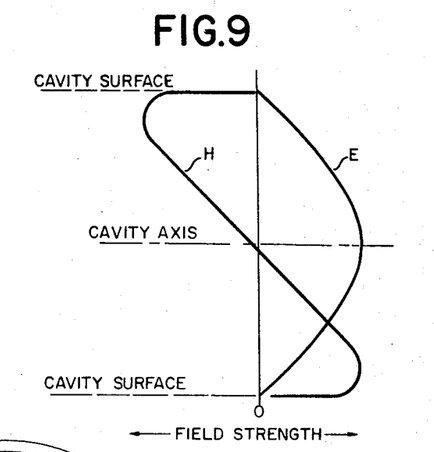
FIGURE 9 is a graph showing the relationship existing at one instant of time between the electric and magnetic fields of a $TM_{101}$ mode waveform within the spherical enclosure of FIGURE 4.

FIGURE 9 is a graph showing schematically the energy levels found within a $TM_{101}$ excited spherical cavity (for example, the cavity 28 of FIGURE 4) at one instant of time. As shown here, the ordinate of the graph represents the energy axis while the abscissa represents distances along a diameter of the cavity 28. With H representing the magnetic field and E representing the electric field, it can be seen that the spherical cavity 28 shown in FIGURE 4 would have a zero magnetic field along a center axis that is horizontal in the position shown in FIGURE 4, while the electric field (represented by E) is at a maximum along this axis. It is also clear that the electric field E falls to zero at the top and bottom of the spherical cavity positioned in FIGURE 4, while the magnetic field H is just slightly below its highest value at these locations.

The drawing of FIGURE 8 illustrates similar electric E and magnetic M fields, the apparatus being depicted here in a wave injection position. It should be noted that, after injection of radio-frequency energy by the wave guide 181 of FIGURE 8 into the cavity 28, and rotation of the container apparatus 50 to a position 90 degrees from that shown in FIGURE 8, the wave guide 181 would be at the point of zero electric field potential (the container 50 being rotated about the waves propagated therein).

It is noted that the motor 188 of the apparatus of FIGURE 8 drives the container 50 through 90 degrees only, after which the motor is de-energized and maintains the container in this 90 degree position with respect to the platform (not shown) until such time as radio-frequency energy injection is again required. At such time the motor 181 is again energized, in the opposite direction, to return the container to the original position for energy injection.

The pivot point 186 of the apparatus of FIGURE 8 is not shown in detail since any suitable pivot may be used. It is pointed out, however, that in addition to the helium supply pipes 182 and 184, a passageway 202 is necessary for the supply and return of power and signal energy to and from the apparatus mounted on the container 50 and rotated with it.

Figure 10:
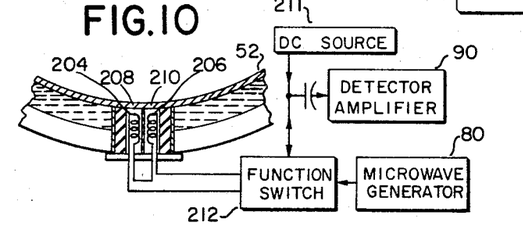
FIGURE 10 is a cutaway view of a portion of a superconductive spherical cavity enclosure having different plane-oriented wave injector and detector means.

FIGURE 10 represents a different embodiment of an arrangement for injecting radio-frequency energy into a superconductive cavity, and then detecting the waveform propagated therein. The arrangement makes use of two small coils 204 and 206 positioned relatively close together and adjacent to the surface of the superconductive material 52 defining the superconductive cavity 28. Assume that the superconductive material 52 has been lowered in temperature by an amount sufficient to transform it into its superconductive state. As indicated by the curves in FIGURES 1 and 2, sufficient microwave energy supplied to the coils 204 and 206 can cause regions of the superconductive material 52 adjacent to the coils to shift in critical temperature requirements (a shift upwardly of a point on the graph of FIGURE 2); a lower temperature (a shift to the left in FIGURE 2) would then be required to maintain the region in a superconductive state. If sufficient microwave energy is supplied to the coils 204 and 206, the critical temperature requirement of the superconductive material 52 in the regions of the coils is lowered until the required critical temperature is lower than the actual temperature maintained by the surrounding liquid helium. The regions 208 and 210 of the cavity defining material 52 adjacent to the coils 204 and 206 thereupon revert to a resistive state, and become capable of radiating microwave energy into the spherical cavity 28 without the necessity of providing mechanical cavity openings. After the desired waveform has been established within the cavity 28, the coils 204 and 206 are de-energized causing the adjacent regions of the cavity to again become superconductive.

After the wave injection has been realized the cavity enclosure 50 can be rotated through 90 degrees (using apparatus similar to that of FIGURE 8) to use the coils 204 and 206 as detecting devices when the coils are positioned adjacent to the horizontal axis (FIGURE 8). For detection purposes it is again necessary to lower the critical or transition temperature, the temperature at which the cavity defining regions 208 and 210 become resistive. Since we do not wish to re-establish microwave energy in the cavity at this position, the coils 204 and 206 are here energized with direct current (as from a direct current source 211), or with a low frequency alternating current, so as not to affect the originally established microwave energy within the cavity. With the regions 208 and 210 adjacent to the coils 204 and 206 in a resistive state, the coils can be used for detection purposes by connection to a suitable detection amplifier, such as the amplifier 90 discussed before. The change in function of the coils 204 and 206 may be realized by any appropriate function switching means, indicated schematically in the drawing by a function switch 212.

The arrangement of FIGURE 10 has been described with the use of two small coils 204 and 206 for rendering resistive a portion of the superconductive cavity 28. It is to be realized, however, that other superconductive to resistive localized transformation means may instead be used. For example, the portions of the superconductive cavity to be transformed into a resistive state may be serially connected in an electric circuit (not shown) so that passage of electric current through these cavity defining portions will transform them into a resistive state. The critical current required to effect this has been discussed above in connection with FIGURE 2. Alternatively, infrared or shorter wave length radiation may be focused upon the cavity defining portions to be transformed into a resistive state. The operation of such radiation transformation arrangements is based upon the fact that the inter-electron energy levels in a superconductive material correspond in energy to the energy quanta present in infrared and shorter wave length radiation. There is an energy gap between the energy level of electrons in a superconductive state and the energy level of electrons in the normal or resistive state. The addition of such energy will raise electrons from one energy level (superconductivity) to the other level (normal resistivity).

Figure 11:
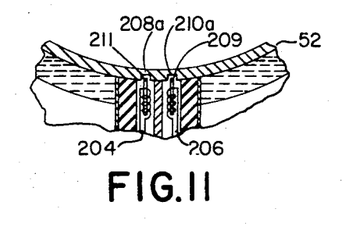
FIGURE 11 is a cutaway view similar to that of FIGURE 10, but illustrating a further embodiment of the invention.
Figure 12:
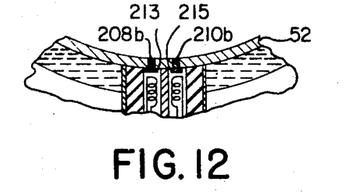
FIGURE 12 is a cutaway view similar to that of FIGURES 10 and 11, but illustrating still another embodiment of the invention.

FIGURES 11 and 12 illustrate modifications of the arrangement illustrated in FIGURE 10. As shown in FIGURE 11, the portions 208a and 210a of the cavity defining material 52 that are to be switched from a superconductive to a resistive state are preferably constructed so that they lend themselves to switching to a greater degree than the other portions of the cavity defining material 52. To this end the coils 204 and 206 are provided with magnetically permeable cores 209 and 211 and the coil-adjacent cavity portions 208a and 210a may be made appreciably thinner than the other portions of the material 52. For example, the cores 209 and 211 may be made of soft iron; also, if the cavity defining material 52 is made of lead, and the greater portion of the cavity defining material is made of the order of at least 5,000 Angstroms in thickness, the coil-adjacent portions 208a and 210a may be of the order of about 500 Angstroms in thickness. In such a case the thinner portions may be readily switched between a superconductive and a resistive state by virtue of the magnetic flux concentrating action of the cores 209 and 211, while the other portions of the cavity defining material are not switched. As will be explained in connection with FIGURE 12, the magnetically permeable flux concentrating means may take forms other than cores; flux concentrating means in the form of thin films of iron (elements 213 and 215 in FIGURE 12) may instead be used.

FIGURE 12 illustrates yet another modification, similar to the modification of FIGURE 11, wherein the cavity defining portions that are to be switched are made of a different material from that of the bulk of the cavity defining material. For example, the portions 208b and 210b that are to be switched may be made of a material having a lower critical transition temperature than the rest of the cavity defining material 52. As illustrated in the graph of FIGURE 1, such portions 208b and 210b may be made of a material such as indium; the indium portions in such a case may be of the same thickness as the rest of the cavity defining material portions. Ideally, these portions 208b and 210b are made of a superconductive material that has a lower transition temperature than the material of the rest of the cavity, and that exhibits a resistivity (when in its resistive state) that is appreciable as compared to the conductivity of the rest of the cavity when the rest of the cavity is in a superconductive state.

In order to enable an even greater control over the switching of the cavity defining portions 208b and 210b between their superconductive and resistive states, thin film magnetic flux concentrating elements 213 and 215 may be positioned closely adjacent to these portions. The elements 213 and 215 may be formed by any of the well-known vacuum deposition techniques, as may the superconductive cavity defining portions 52, 208b, and 210b. Furthermore, it is to be understood that while the magnetically permeable, magnetic flux concentrating elements are shown herein as applied to a superconductive cavity portion switching arrangement, such flux concentrating elements may be used in connection with superconductive computer switching elements both for assuring more reliable switching of the switching element, and for enabling the switching to be realized with a lower switching current. Some of the kinds of computer switching elements that may take advantageous use of such a flux concentrating arrangement are described in "Low Temperature Physics and Chemistry," by Joseph R. Dillinger, 1958, published by the University of Wisconsin Press, Madison, Wisconsin, for example the persistent current element described at page 232 by Eugene C. Crittenden, Jr.

It should be pointed out at this time that separate energy transmission coils, positioned in 90 degree physical displacement with respect to each other, may instead be used; for example, one pair of coils may be used for energy injection and another pair for detection. Such an alternate arrangement has not been specifically illustrated since it is obvious from the configuration of FIGURE 4 that two separate energy transmission means may be used, one for detection and the other for injection.

Figure 13:
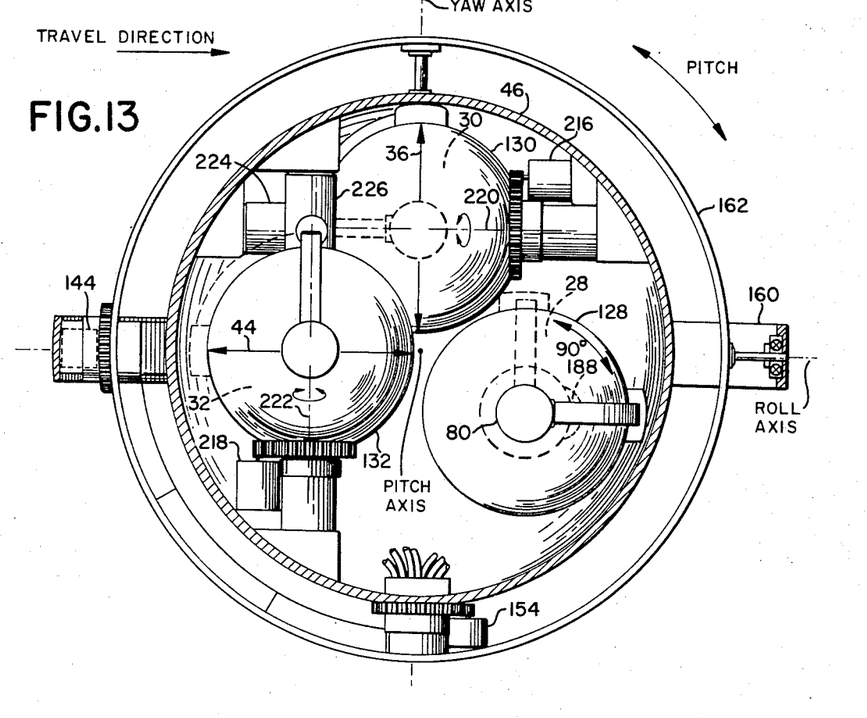
FIGURE 13 is a view of another gimbaled inertial guidance system, similar to that of FIGURE 8, utilizing three superconductive spheres each provided with a common wave injection and detection means.

FIGURE 13 is a schematic representation of a spherical platform 46 containing three spherical sensing cavities such as the cavities 28, 30, and 32 of FIGURE 7, with each of the three cavities having a single waveform injection and detection means. In this respect each of the cavities is similar to the one illustrated in FIGURE 8. The platform 46 is driven about its yaw axis by the drive motor 154, and about its roll axis by the drive motor 144. In addition, the pitch axis is provided with its drive motor 94 (shown in FIGURE 7). These motors maintain the platform 46 in proper reference with respect to the microwave energy within the cavities 28, 30, and 32.

As has been indicated in connection with the apparatus of FIGURE 8, each of the cavity defining enclosures 128, 130, and 132 is mounted for 90 degree rotation so that a single cavity opening may be used for energy injection and for energy detection. Thus, in addition to the 90 degree position motor 188 for the first cavity enclosure 128, the other cavity enclosures 130 and 132 are provided with drive motors 216 and 218, respectively. The motors 216 and 218 are for the purpose of shifting the cavity enclosures 130 and 132 about their axes 220 and 222, respectively, for the purpose of shifting each wave guide and associated cavity 30 and 32 between injection and detection positions.

Each of the cavities 28, 30, and 32 is preferably provided with its own signal generator 80, 224, and 226, respectively, each similar to the generator 80 shown in FIGURE 8. It is desirable to provide separate signal generators in the arrangement of FIGURE 14 since the individual cavity defining enclosures are independently rotatable.

The platform 46 is preferably made in the form of a hollow sphere so that it not only provides a support base for each of the three sensing cavities, but in addition is capable of providing additional thermal insulation. With the platform arrangement of FIGURE 13 is it possible to eliminate the separate evacuated cavities 65 (FIGURES 5 and 6) provided for each of the sensing cavities 28, 30, and 32. The platform 46 of FIGURE 14 is supported on gimbals 160 and 162 for universal movement as explained in connection with FIGURE 7.

Figure 14:
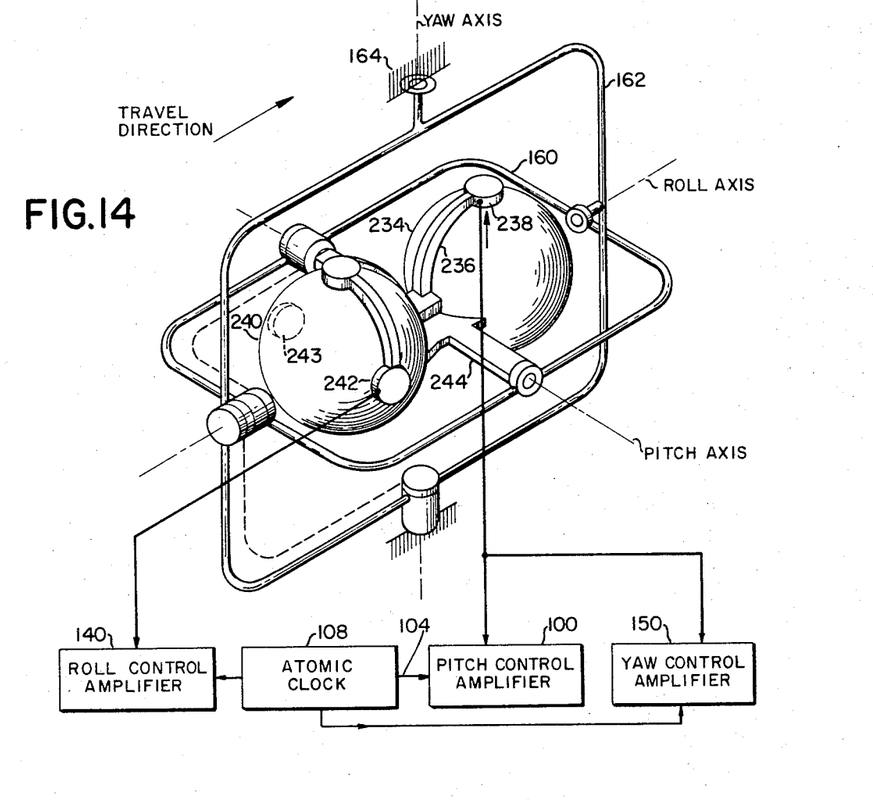
FIGURE 14 is a diagrammatic view of an embodiment of the invention using two superconductive enclosures for providing guidance information relative to three mutually perpendicular directions.

FIGURE 14 depicts an inertial reference system using two spherical, superconductive cavities for providing three axes direction detection. In this system a single cavity is used to provide information relative to two directions. When a waveform is injected into a cavity 234 by a suitable wave guide 236, a node point is established in the electrical field that is 90 degrees displaced from the point of injection. If a wave energy detector 238 is positioned to examine wave energy at the node point, this detector becomes responsive to energy when the cavity is displaced in any direction away from the wave node. The detected signal is applied to two control amplifiers 100 and 102, and is compared with the atomic clock signal from an atomic clock 108. The detector-amplifier 100 is connected to be responsive only to signals bearing approximately either 180 degrees or 360 degrees with respect to the atomic clock signal, while the other control amplifier 150 is connected to be responsive only to signals bearing either 90 degrees or 270 degrees with respect to signals from the atomic clock 108. Consequently, relative motion (between the cavity defining enclosure and waves propagated within it) in two mutually perpendicular planes is realized with the use of a single superconductive cavity.

Referring to FIGURE 14 in further detail, it is to be noted that the pitch control detector-amplifier 100 is responsive only to one plane of relative movement of the cavity 234 while the other detector-amplifier 150 associated with this cavity, the yaw control amplifier, is responsive only to a substantially perpendicular plane of relative cavity movement. The only relative movement to which the detector 238 is not responsive is roll—movement of the detector 238 in directions along the axis of the node of the wave within the cavity 234. A second cavity 240, and associated circuitry, is provided in order to make the system responsive to such third plane movement. The second cavity 240 is provided with a detector 242 oriented 90 degrees with respect to the detector 238 of the first cavity 234. The waveform injected into the second cavity is also injected at a point 90 degrees removed with respect to the waveform introduced into the first cavity 234. For this reason, the second detector 242 is oriented adjacent to the node of the waveform within the second cavity 240.

The relative orientation of the two cavities 234 and 240 is maintained by virtue of a secure mounting 244 that fixes the cavities with respect to each other. The second detector 242, being displaced 90 degrees with respect to the first detector 238, provides an output signal to a roll control amplifier 140 which in turn provides an output signal in response to any rotational movement of the platform about the roll axis. The output signals from the three amplifiers 100, 140, and 150 are then filtered and utilized for vehicle control in the manner described above in connection with FIGURE 7.

For purposes of explanation each of the two cavities 234 and 240 of the apparatus of FIGURE 14 has been described as using a single rectangular wave guide (and single associated wave orientation detector) for detecting two mutually perpendicular wave orientations at the output of each cavity. However, it is realized that the relative wave orientation may not be accurately transmitted to the detector, due for example to interaction between the two mutually perpendicular wave portions during their passage from the cavity to the detector. Accordingly, problems associated with the coupling and transmission of two mutually perpendicular wave portions into and through a rectangular wave guide, without error producing interaction between the wave portions, are preferably avoided through the use of two separate detectors—a separate detector for each of the two directions about which information is desired. As has been explained in connection with FIGURE 9, the electric field of the cavity-contained wave has two oppositely located regions of zero field potential. Therefore, one detector 242 is located at one of these regions while the other detector (indicated in phantom at 243) is located at the other of these regions. Each of the detectors 242 and 243 would then be associated with a rectangular cavity-coupled wave guide whose width dimension is perpendicular to the width dimension of the other wave guide. While two separate cavity-wave guide couplings are used for energy detection, only one of the cavity-wave guide couplings is needed to inject the entire waveform into the cavity.

Figure 15:
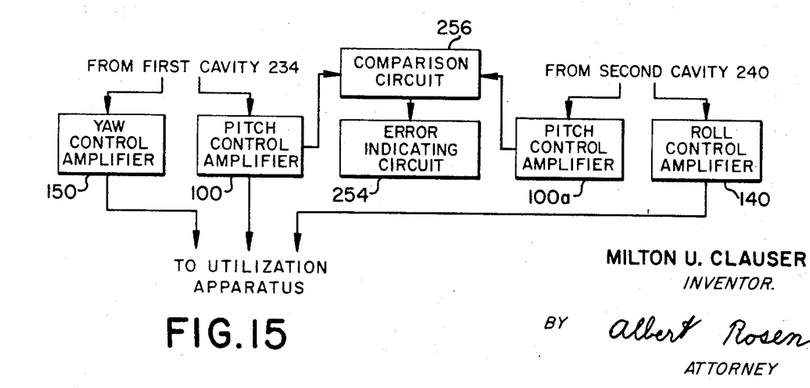
FIGURE 15 is a block diagram of an error detecting arrangement useful in connection with the embodiment of FIGURE 14.

FIGURE 15 depicts a further advantage that may be realized in the operation of the system depicted in FIGURE 14. In the system of FIGURE 14, the two separate cavities 234 and 240 may each be used to monitor two directions. In such a case the two cavities would independently monitor the same direction, say the pitch. The separately measured values of the same direction may be compared—they should be the same. If they are not the same, their difference is a measure of magnitude of error. In such a case, while it is not known which of the two measurements are in error (or whether both are in error) the error signal may be used to operate an alarm or error indicating circuit 254 (FIGURE 15) to point out the magnitude of the relative error.

In the operation of the circuit of FIGURE 15 the yaw and pitch outputs from the first cavity 234 (FIGURE 14) are fed to their respective amplifiers 150 and 100; and the roll and pitch outputs from the second cavity 240 (FIG- URE 14) are fed to their respective amplifiers 140 and 100a. The yaw and pitch amplifier outputs derived from the first cavity 234 are passed to appropriate utilization apparatus, but a portion of the first cavity pitch amplifier output is fed to a signal comparison circuit 256. The output from the pitch amplifier 100a of the second cavity 240 is fed to the same comparison circuit 256. The output from the comparison circuit 256 is used to control the operation of the error indicating circuit 254. This circuit 254 may be used for any appropriate end use; for example, it may be used to compare the detected relative error with other relative errors (from other similar apparatus, not shown) to determine the nature and extent of error.

In the foregoing explanations involving the detection of two mutually perpendicular directions through the use of a single superconductive cavity, a spherical cavity $TM_{101}$ wave propagation mode and mutually perpendicular cavity-sustained wave portions have been discussed. It is to be appreciated, however, that other modes may instead be used, and that the direction defining wave portions of some of these other modes are not perpendicular with respect to each other.

Some facts about actual dimensions and operations are given although it is to be understood that these specifics are not to be construed as representing the limits of the system, but merely examples of a typical system. In practicing the invention the cavity is preferably made as large as practicable for the environment in which it is used, for example, at least of the order of a large fraction of a meter. The reason for this is that a superconductive material apparently develops skin resistance and absorbs energy when subjected to relatively high frequency electric currents. While this skin resistance does not approach values as high as the resistance ordinarily associated with normal conductive materials until frequencies as high as those in the infrared region are used, the skin resistance becomes effective in slowly dampening the cavity injected waves at microwave frequencies. Consequently, cavity-operating frequencies are preferably chosen to be in the hundreds of megacycles per second region and lower.

One example of the foregoing may be seen in the subjection of tin to microwave energy. It has been found that when tin at 3 degrees Kelvin is subjected to microwave energy at a frequency of $10^9$ cycles per second, the resistivity of the tin surface is increased from zero to of the order of one percent of the normal, non-superconductive resistivity. It has been found that the resistivity increases as the 4/3 power of the frequency in this microwave region. However, it is believed that the resistivity goes back to zero as the temperature goes to 0 degrees Kelvin. Thus it is seen that the life of the wave energy injected into a cavity depends upon the cavity size and temperature, upon the type of superconductive cavity defining material used, and upon the frequency of the contained radio-frequency energy.

From the foregoing it is seen that the arrangement of the invention provides improved control means useful in providing inertial reference information.

What is claimed is:

1. In combination: a member defining a cavity and constructed essentially of superconductive material and capable of sustaining an electromagnetic waveform within the cavity, and movable shimming means mounted for extension into the cavity for altering the electrical cavity-defining contour of the cavity, said superconductive material being of two different types, with the material of one type having a critical superconductive-to-resistive transition temperature appreciably lower than that of the material of the other type, one portion of the cavity being defined by material of the one type, and other portions of the cavity being defined by material of the other type, and means for rendering said one portion selectively resistive or superconducting, without affecting a simultaneous superconducting condition of said other portions, whereby electromagnetic energy may be selectively injected, sustained, and detected in said cavity.

2. In an inertial guidance system comprising a plurality of superconductive means each defining a plurality of cavities: energy injection and detection means associated with each of said superconductive means; said energy injection and detection means comprising a plurality of flux producing means each positioned adjacent to a surface portion of its associated superconductive cavity; and means for energizing said flux producing means for making said superconductive cavities resistive in regions adjacent to said flux producing means for energy injection and detection purposes; said means for energizing said flux producing means comprising a source of microwave energy connected to energize said flux producing means during injection and a direct current source connected to energize said flux producing means during detection.

3. In combination: two superconductive cavity-defining means; separate electromagnetic energy injecting means associated with each of said cavity-defining means for establishing, in each of said cavity-defining means, two electromagnetic energy waveforms having mutually perpendicular orientations, with the orientation of one of the waveforms in one of said cavity-defining means having the same orientation as one of the waveforms in the other of said cavity-defining means; separate electromagnetic energy detection means associated with each of cavity-defining means for determining the orientation of each of said waveforms; and waveform orientation comparision means connected to both of said detection means to compare the two waveforms established with a common orientation.

4. A direction indicating system including superconductive means of the type adapted to sustain the propagation of electromagnetic energy therein and including a member defining a cavity and constructed essentially of superconductive material; and electromagnetic energy injection and detection means associated with said cavity and comprising switching means positioned adjacent to a surface portion of said member for transforming said surface portion from a superconducting to a resistive state for transmission of electromagnetic energy into and out of said cavity; said surface portion being constructed of a superconductive material having a lower critical superconducting-resistive transition temperature than that of the superconductive material of other regions of said member and capable of being transformed from a superconducting to a resistive state during subjection to said switching means without transforming said other regions of said members from a superconducting to a resistive state, whereby electromagnetic energy may be selectively injected, sustained, and detected in said cavity.

5. In a direction indicating system including superconductive cavity memory means of the type adapted to sustain an electromagnetic wave therein and including means constructed essentially of superconductive material and defining a cavity; electromagnetic energy injection and detection means associated with said cavity and comprising magnetic flux producing means positioned adjacent to a surface portion of said cavity defining means, said flux producing means including a ferromagnetic element positioned to direct the magnetic flux produced by said flux producing means to selected regions of said surface portion; and means for energizing said flux producing means with sufficient energy to transform said selected regions from a superconducting to a resistive state for enabling transmission of electromagnetic energy into and out of said cavity.

6. The invention according to claim 5 wherein said ferromagnetic element is in the form of a thin film.

7. An inertial guidance system comprising: superconductive means defining a cavity; means mounting said cavity defining means for rotational movement; energy injection means for injecting electromagnetic energy into said cavity to establish a waveform having a predictable orientation within said cavity; and detection means for detecting rotational movement of said cavity defining means relative to said waveform; at least one of said last two mentioned means including magnetic flux producing means positioned adjacent to said cavity defining means for concentrating magnetic flux on a relatively small superconducting portion of said cavity defining means to render said small portion resistive without altering the superconducing state of the remainder of said cavity defining means.

8. The invention according to claim 7 wherein said relatively small superconducting portion is made of a material having a lower critical transition temperature than the material of the major portion of said cavity defining means.

9. The invention according to claim 7 wherein said flux producing means includes a ferromagnetic element mounted adjacent to said relatively small superconducting portion.

10. The invention according to claim 7, wherein said detection means is positioned at a predetermined node position of said waveform.

References Cited by the Examiner
UNITED STATES PATENTS

| | | | |
|---|---|---|---|
| 2,704,431 | 3/55 | Steele | 307—88.5 |
| 2,863,998 | 12/58 | Marie. | |
| 2,890,421 | 6/59 | Currie | 333—83 |
| 2,914,736 | 11/59 | Young | 333—99 X |

OTHER REFERENCES

Grebenkemper et al.: Physical Review, volume 86, No. 5, June 1952, pp. 673–697.

Mendelssohn et al.: Royal Society of London, Proceedings, volume 151, Series A, No. 873, Sept. 2, 1935, pages 316 to 333 included.

RICHARD C. QUEISSER, *Primary Examiner.*

FREDERICK M. STRADER, CHESTER L. JUSTUS, MAYNARD R. WILBUR, *Examiners.*